United States Patent
Kato et al.

(10) Patent No.: US 7,203,395 B2
(45) Date of Patent: Apr. 10, 2007

(54) MINIATURE MOVABLE DEVICE

(75) Inventors: Yoshichika Kato, Tachikawa (JP);
Keiichi Mori, Tokyo (JP); Satoshi Yoshida, Tama (JP); Osamu Imaki, Hachioji (JP); Yoshihiko Hamada, Akiruno (JP); Kenji Kondou, Chofu (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 10/957,284

(22) Filed: Oct. 1, 2004

(65) Prior Publication Data

US 2005/0078907 A1    Apr. 14, 2005

(30) Foreign Application Priority Data

Oct. 10, 2003    (JP)    ............................. 2003-352094

(51) Int. Cl.
*G02B 6/35* (2006.01)
*G02B 26/08* (2006.01)

(52) U.S. Cl. ............................ 385/18; 385/16; 385/19; 359/224

(58) Field of Classification Search ............. 385/16–24
See application file for complete search history.

(56) References Cited

U.S. PATENT DOCUMENTS

| | | | |
|---|---|---|---|
| 6,303,885 B1 * | 10/2001 | Hichwa et al. ............. 200/181 |
| 6,315,462 B1 | 11/2001 | Anthamatten et al. | |
| 6,360,033 B1 * | 3/2002 | Lee et al. ...................... 385/18 |
| 6,360,035 B1 * | 3/2002 | Hurst et al. ................... 385/18 |
| 6,415,068 B1 * | 7/2002 | Sun ............................. 385/16 |
| 6,541,831 B2 * | 4/2003 | Lee et al. .................... 257/415 |
| 6,728,018 B2 | 4/2004 | Norimatsu | |
| 6,794,217 B2 * | 9/2004 | Lee et al. ...................... 438/72 |
| 6,804,036 B1 * | 10/2004 | Chen et al. ................. 359/237 |
| 6,815,865 B2 * | 11/2004 | Marxer ....................... 310/309 |

(Continued)

FOREIGN PATENT DOCUMENTS

WO    01011411    2/2001

*Primary Examiner*—John D. Lee
*Assistant Examiner*—Rhonda S. Peace
(74) *Attorney, Agent, or Firm*—David N. Lathrop, Esq.; Gallagher & Lathrop (57) ABSTRACT

A miniature movable device comprises a movable part (a mirror, a movable rod, support arms, and a movable comb tooth electrode) formed on a substrate and adapted to be displaced in a direction parallel to the sheet surface of the substrate, a fixing part formed and fixedly mounted on the substrate, and hinges, each having its opposite ends connected to the movable part and the fixing part and assuming two flexural conditions which are reversed in flexural, the hinges being effective to maintain the movable part at two positions by a self-holding action when it assumes either flexural condition. The substrate is formed with wall surfaces which are disposed oppositely to the opposite surfaces of the hinges over a movable range of the hinges. Spacings between the hinges and the wall surfaces disposed on the opposite sides thereof are equal to each other at every point along the lengthwise direction of the hinges when the hinges assume one of the two flexural conditions (an initial condition assumed upon manufacture). This eliminates an inconvenience that during a drying step which follows a wet etching operation during the manufacture, a liquid may remain on only one side of the hinges to cause the hinges to be held attracted to the wall surfaces.

5 Claims, 9 Drawing Sheets

U.S. PATENT DOCUMENTS

| | | |
|---|---|---|
| 6,865,313 B2 * | 3/2005 | Mao et al. .................... 385/18 |
| 6,905,614 B1 * | 6/2005 | Novotny ....................... 216/2 |
| 7,003,193 B2 * | 2/2006 | Kato et al. .................... 385/18 |
| 7,039,268 B2 * | 5/2006 | Yoshida et al. ............... 385/18 |
| 2001/0051014 A1 * | 12/2001 | Behin et al. .................. 385/16 |
| 2005/0069246 A1 | 3/2005 | Kato et al. |

* cited by examiner

MINIATURE MOVABLE DEVICE

BACKGROUND OF THE INVENTION

The present invention relates to a miniature movable device including a movable part and a drive which drives the movable part, both formed on a substrate, such as an optical switch including a mirror as a movable part or a relay device including a movable electrode as a movable part, for example, and in particular, to a miniature movable device in which the movable part is supported by a hinge or hinges which reverse in flexural to allow the movable part to be self-held in one of two positions in a stable manner.

To illustrate a miniature movable device including a movable part and a hinge or hinges and which is manufactured by a technique such as photolithography or etching process, an optical switch including a mirror, hinges, an actuator and a light guide formed on a substrate and having the function of switching a light path by a movement of the mirror into and out of the light guide will be described first even though the movable part is not arranged to be self-held in two stable conditions by hinges which reverse in flexural in this instance.

Figure 1:
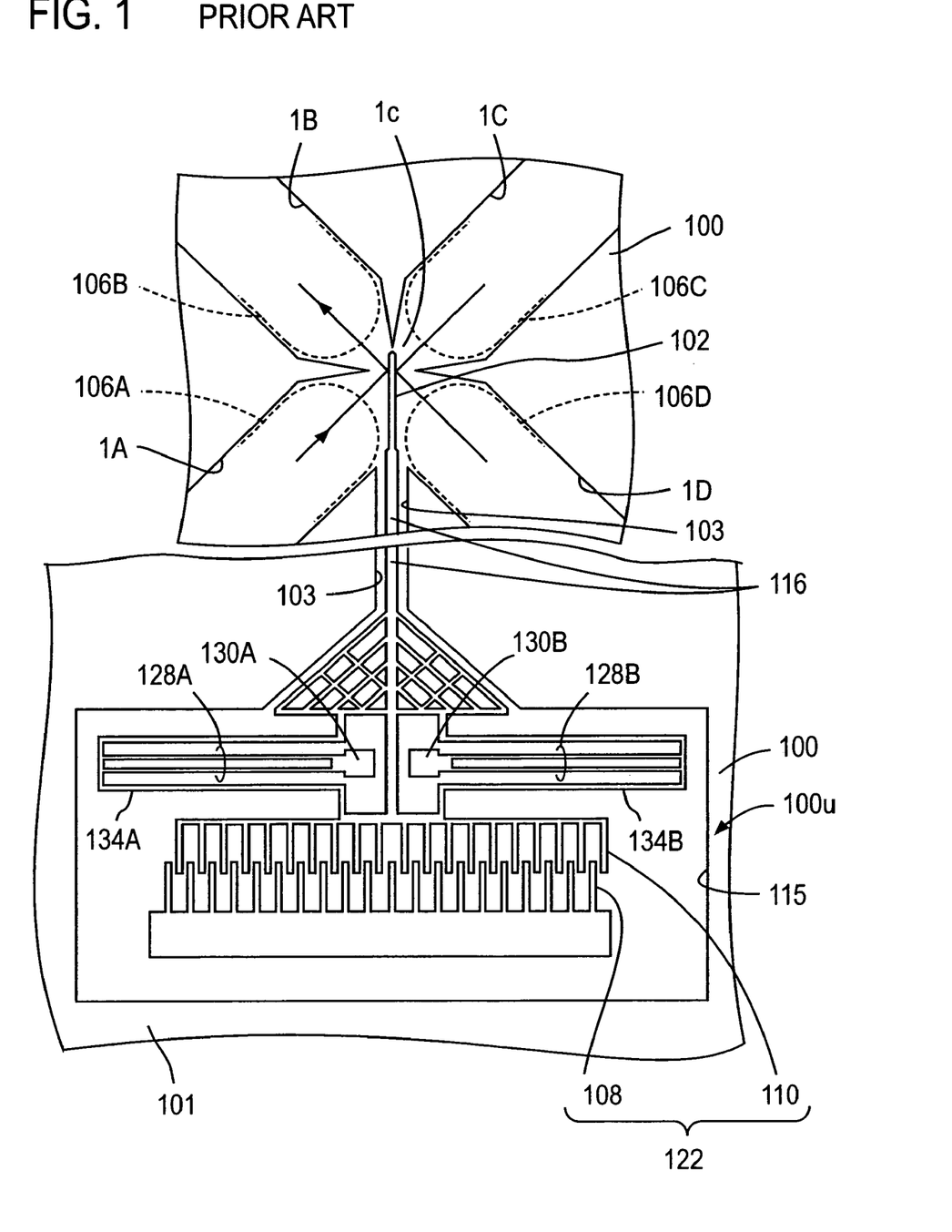
FIG. 1 is a plan view of a conventional optical switch shown as an example of a miniature movable device.

FIG. 1 shows the construction of an MEMOS (Micro-Electro-Mechanical System) optical switch disclosed in International Laid-Open No. WO 01/011411, issued Feb. 15, 2001.

A sheet-like substrate 100, which is shown as divided into two portions in FIG. 1 to omit an intermediate portion though the both portions are integral parts of the same substrate, has a top surface 100$u$ in which four fiber channels 1A to 1D are formed in a crisscross configuration and have their one end connected together. An area defined between the fiber channels 1A and 1D which are perpendicular to each other defines a drive formation 101.

A slot 103 is formed in the top surface 100$u$ of the drive formation 101 at an angle of 45° with respect to each of the fiber channels 1A and 1D, and a movable rod 116 is disposed in the slot 103. Support frames 134A and 134B are connected at their one end to the opposite sides of the movable rod 116 and are connected at the other end to fixing supports 130A and 130B, respectively, through hinges 128A and 128B, respectively, which are in the form of leaf springs, whereby the movable rod 116 is supported so as to be movable lengthwise thereof and parallel to the sheet surface (top surface 100$u$) of the substrate 100.

Four optical fibers 106A to 106D are disposed in the fiber channels 1A to 1D, respectively, and a mirror 102 carried by one end of the movable rod 116 is disposed at the center 1$c$ of a radial disposition of the optical fibers 106A to 106D, and the other end of the movable rod 116 is connected to a comb tooth type electrostatic actuator 122.

The comb tooth type electrostatic actuator 122 comprises a movable comb tooth electrode 110 and a fixed comb tooth electrode 108, both extending crosswise of or in a direction perpendicular to the lengthwise direction of the movable rod 116 to the opposite sides thereof and having comb teeth extending lengthwise of the movable rod 116. The movable comb tooth electrode 110 is secured to the movable rod 116 while the fixed comb tooth electrode 108 is secured to the bottom of a recess 115 formed in the top surface 100$u$ of the drive formation 101.

It is to be noted that the recess 115 is formed in continuous relationship with the slot 103, and the movable rod 116 extends into the recess 115, and accordingly, the comb tooth type electrostatic actuator 122, the hinges 128A and 128B, the support frames 134A and 134B and the fixed supports 130A and 130B are positioned within the recess 115. It is to be noted that the fixed supports 130A and 130B are secured to the bottom of the recess 115 in the similar manner as the fixed comb tooth electrode 108, but structures other than the fixed comb tooth electrode 108 and the fixing supports 130A and 130B are floating with air gaps with respect to the bottom surface of the recess 115.

When a voltage is applied across the movable comb tooth electrode 110 and the fixed comb tooth electrode 108, an electrostatic force of attraction is developed to move the movable rod 116 toward the fixed comb tooth electrode 108, thus maintaining the mirror 102 extracted from the center 1$c$. When the application of the voltage is ceased, the resilient restoring force of the hinges 128A and 128B causes the movable rod 116 to be returned toward the center 1$c$, whereby the mirror 102 reverts to its original position at the center 1$c$.

When the mirror 102 is positioned at the center 1$c$, light which is emitted from the optical fiber 106A, for example, is reflected by the mirror 102 to impinge on the optical fiber 106B, and light which is emitted from the optical fiber 106D is reflected by the mirror 102 to impinge on the optical fiber 106C. When the mirror 102 is extracted from the center 1$c$, light emitted from the optical fiber 106A impinges on the optical fiber 106C, and light emitted from the optical fiber 106D impinges on the optical fiber 106B.

In the conventional optical switch shown in FIG. 1, in order to maintain the mirror 102 extracted from the center 1$c$, it is necessary that a voltage be continuously applied across the both comb tooth electrodes 108 and 110 to increase a power dissipation, which is uneconomical. In consideration of this, an optical switch has been proposed which employs hinges capable of maintaining two stable flexures by a reversal operation therebetween to allow the mirror, which is positioned at the center 1$c$ or extracted from the center 1$c$ by the application of the voltage to the electrostatic actuator, to be maintained in either condition when the voltage ceases to be applied. Such an optical switch will now be described.

Figure 2:
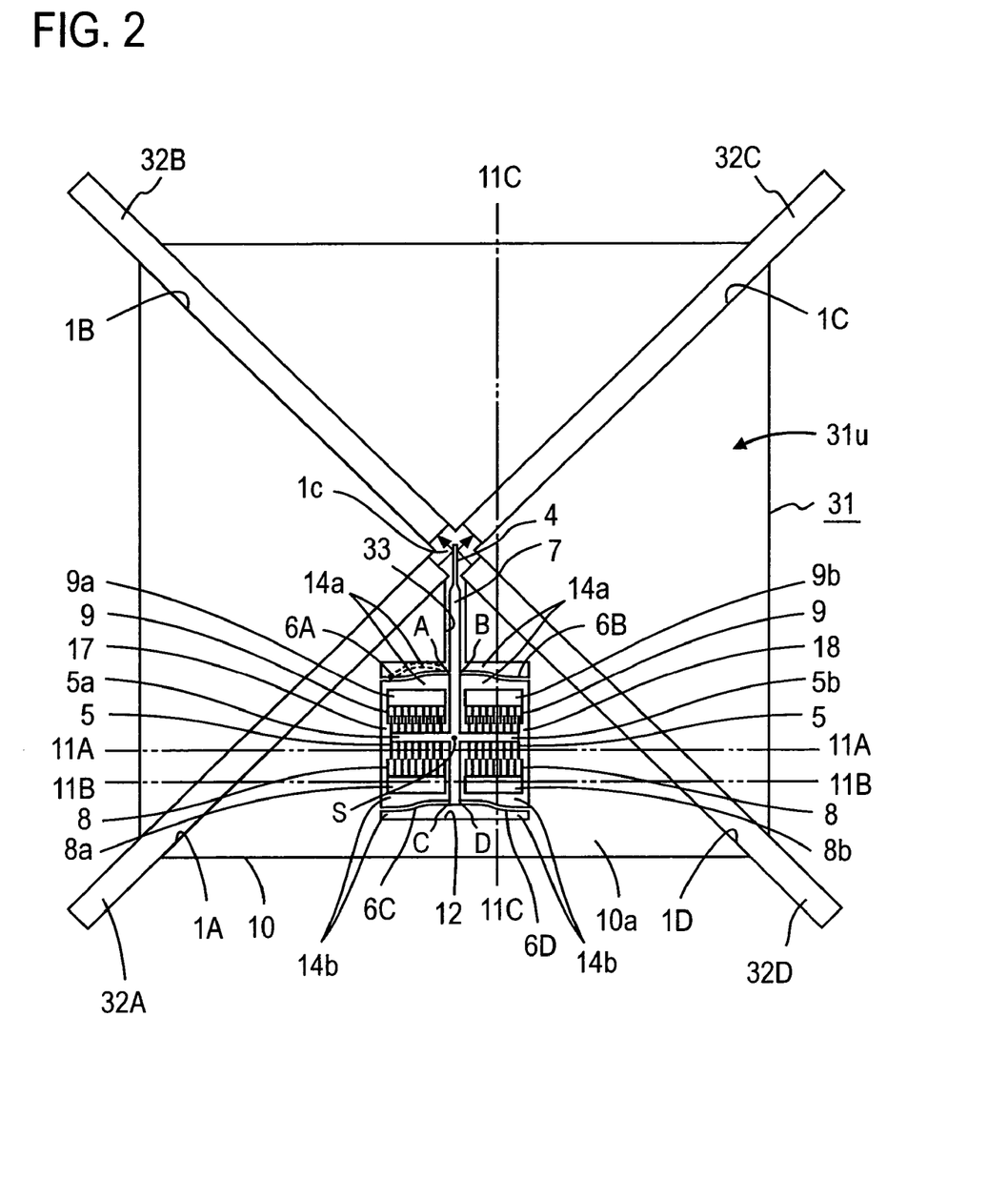
FIG. 2 is a plan view of an exemplary optical switch which is capable of self-holding a movable part at two positions by the use of hinges which reverse in flexural.
Figure 3A:
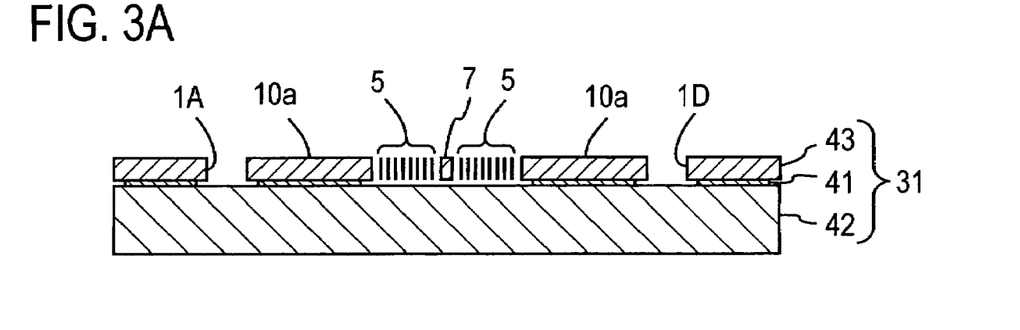
FIG. 3A is a cross section of the optical switch shown in FIG. 2 taken along the line 11A—11A.
Figure 3B:
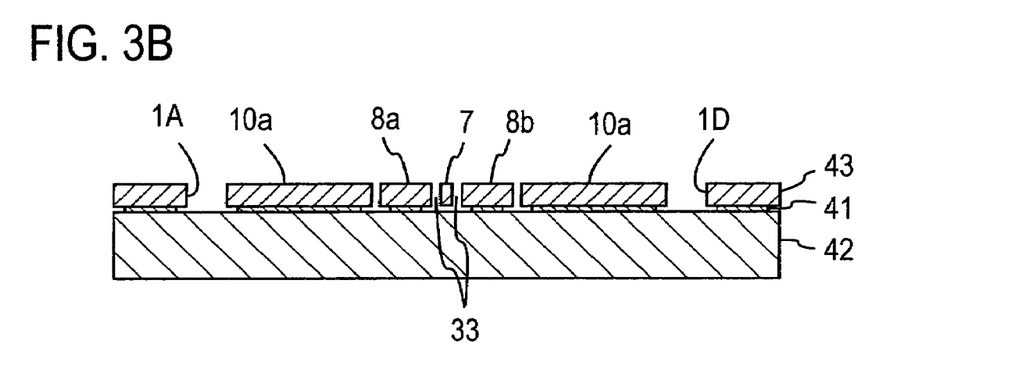
FIG. 3B is a cross section of the optical switch shown in FIG. 2 taken along the line 11B—11B.
Figure 3C:
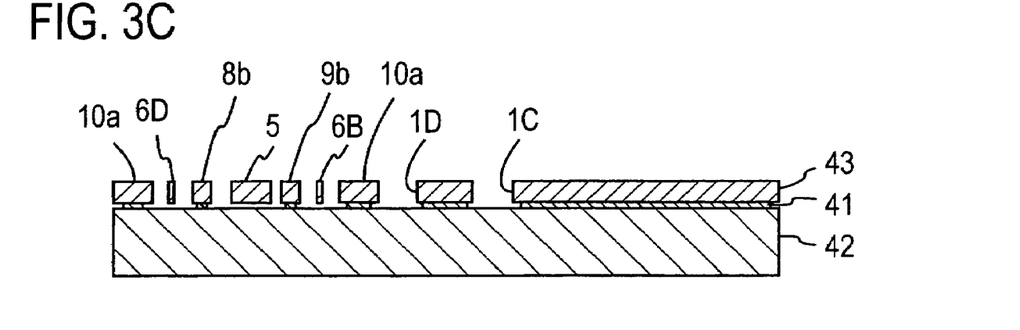
FIG. 3C is a cross section of the optical switch shown in FIG. 2 taken along the line 11C—11C.
Figure 4:
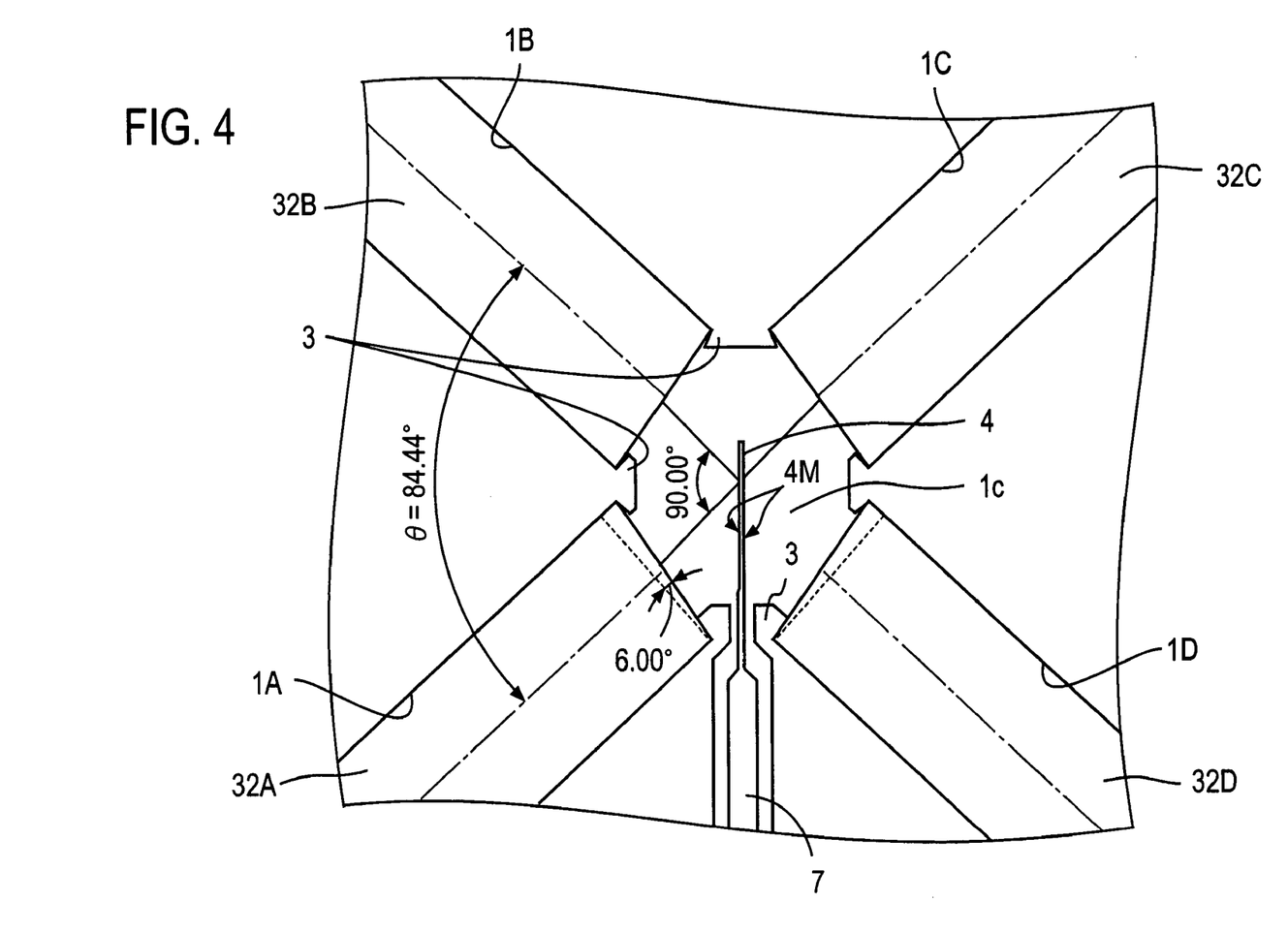
FIG. 4 is a fragmentary plan view, to an enlarged scale, of a construction located around the center of crisscross fiber channels of the optical switch shown in FIG. 2.

FIG. 2 is a plan view of such an optical switch, and FIGS. 3A to 3C show the construction in cross sections. Specifically, a sheet-like substrate 31 has a top surface 31$u$ in which fiber channels 1A to 1D are formed in a crisscross configuration as shown in FIG. 2, and the four fiber channels 1A to 1D which extend radially with respect to the center 1$c$ of the fiber channels 1A to 1D in the crisscross configuration receive optical fibers 32A to 32D therein. As shown in FIG. 4, the optical fibers 32A to 32D are inserted into the respective fiber channels 1A to 1D as a press fit to be held between the both sidewalls of the fiber channels 1A to 1D, and have end faces which are disposed in abutment against abutment projections 3 disposed toward the center 1$c$, whereby the optical fibers 32A to 32D are positioned relative to the substrate 31. In this example, the end face of each of the optical fibers 32A to 32D is beveled at an angle of 6°, for example, with respect to a plane which is perpendicular to the fiber axis and abraded to form a collimation fiber.

As shown in FIG. 2, one of four areas in the top surface 31$u$ of the substrate 31 which are divided by the fiber channels 1A to 1D defines a drive formation 10, in which a rod channel 33 is formed in a manner to bisect the drive formation 10 and communicates with the center 1$c$. A movable rod 7 is disposed in the rod channel 33, and carries a mirror 4 at its one end which is located toward the center 1$c$. Hinges 6A to 6D in the form of leaf springs are connected to the opposite sides of the movable rod 7 at two locations thereof to allow the movable rod 7 to be supported by a fixing part 10a formed by the drive formation 10 so as to be movable lengthwise and parallel to the sheet surface of the substrate 31 (top surface 3u). In this example, the hinges 6A to 6D have flexed configurations such that their sheet surfaces are slightly flexed centrally along the length thereof while the opposite ends as viewed lengthwise are parallel to each other, whereby the hinges can assume one of two stable flexural conditions which are reversed in flexural.

A comb tooth type electrostatic actuator is provided between the hinges 6A and 6B which are disposed intermediate the length of the movable rod 7 and the hinges 6C and 6D which are located at the other end of the movable rod 7 which is disposed opposite from the mirror 4, and includes a movable comb tooth electrode 5 which is secured to the opposite sides of the movable rod 7. In this example, the movable comb tooth electrode 5 comprises comb teeth formed on support arms 5a and 5b which have their one end secured to the opposite sides of the movable rod 7 and extending toward the hinges 6A and 6B and toward the hinges 6C and 6D. A first and a second fixed comb tooth electrode 8 and 9 are disposed on the side toward the hinges 6C and 6D and on the side toward the hinges 6A and 6B of the movable comb tooth electrode 5 so as to mesh with the movable comb tooth electrode 5. The first and the second fixed comb tooth electrode 8 and 9 are fixedly mounted on fixing parts 8a, 8b and 9a, 9b which are formed on the drive formation 10. It is to be noted that the hinges 6A and 6B and the hinges 6C and 6D are disposed in recesses 14a and 14b which are formed in the drive formation 10.

The recess 14a in which the hinges 6A and 6B are disposed and the recess 14b in which the hinges 6C and 6D are disposed communicate with each other through communication channels 17 and 18 which are formed in the top surface 31u so as to extend parallel to the length of the movable rod 7 at a location where the movable comb tooth electrode 5 is disposed. The recesses 14a and 14b and the communication channels 17 and 18 define an outer profile of a recess 12 in which one-half of the movable rod 7 which is located opposite from the mirror 4, the support arms 5a and 5b, the movable comb tooth electrode 5, the first and the second fixed comb tooth electrode 8 and 9 and the fixing parts 8a, 8band 9a, 9b are disposed, and the fixing parts 8a, 8b, 9a, and 9b are secured to the bottom surface of the recess 12 through an intermediate insulating layer 41 as will be described later. It is to be understood that the fixing part 10a represents a remainder of the drive formation 10 from which the recess 12 and the rod channel 33 are excluded.

Figure 5A:
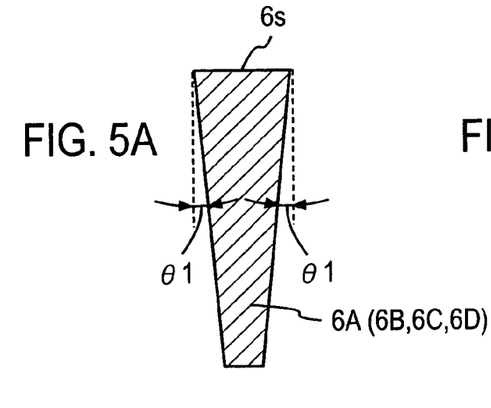
FIG. 5A is an enlarged cross section showing an example of the cross-sectional configuration of a hinge used in the optical switch shown in FIG. 2.
Figure 5B:
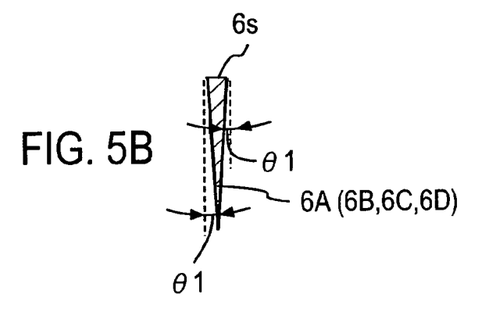
FIG. 5B is an enlarged cross section showing another example of the cross-sectional configuration of the hinge used in the optical switch shown in FIG. 2.

As viewed in cross-sectional configuration, the hinges 6A to 6D have tapered surfaces in that the both lateral surfaces of each of the hinges are inclined by an order of θ1=0.5°, thus having a width which is gradually decreasing as further removed from the surface 6s of the substrate 31 (top surface 31u). By way of example, the hinges 6A to 6D have a cross-sectional configuration which is trapezoidal having a broader top side relative to a base as shown in FIG. 5A or which is triangular as shown in FIG. 5B. The use of such a configuration allows a width as measured on the surface which is required to provide an equivalent spring constant to be broader than when the cross section is rectangular, facilitating the photolithography during the manufacturing process.

The hinges 6A to 6D have two stable flexural conditions which are reversed in flexural. Accordingly, in an initial configuration which prevails upon manufacture of the optical switch (first stable state), it may be assumed that the mirror 4 is inserted into the center 1c. At this time, light emitted from the optical fiber 32A is reflected by the mirror 4 to impinge on the optical fiber 32B. Light emitted from the optical fiber 32D is reflected by the mirror 4 to impinge on the optical fiber 32C.

Figure 6:
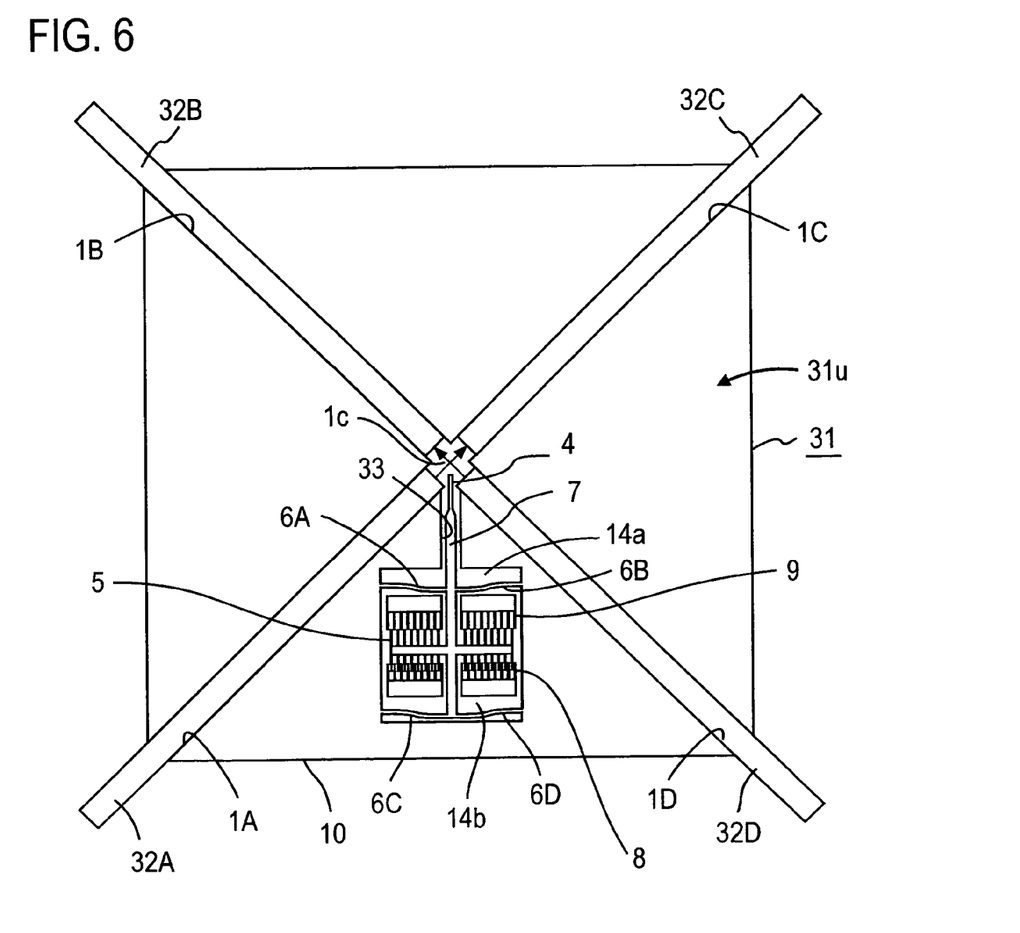
FIG. 6 is a plan view illustrating a condition in which the mirror of the optical switch shown in FIG. 2 is retracted from the center of the fiber channels.

When a voltage is applied to the first fixed comb tooth electrode 8 while connecting the fixing part 10a which is electrically connected to the movable comb tooth electrode 5 through the support arms 5a and 5b, the movable rod 7 and the hinges 6A to 6D and the second fixed comb tooth electrode 5 to the ground, an electrostatic force of attraction acts between the first fixed comb tooth electrode 8 and the movable comb tooth electrode 5, and if this force is greater than the force which tends to retain the first stable state, the hinges 6A to 6D reverse to their second stable state, which is maintained by a self-holding action if the voltage ceases to be applied. At this time, the mirror 4 is retracted from the center 1c as shown in FIG. 6, whereby light emitted from each of the optical fibers 32A and 32D impinges on the optical fibers 32C and 32B, respectively. On the other hand, when a voltage is applied to the second fixed comb tooth electrode 9 while connecting the fixing part 10a and the first fixed comb tooth electrode 8 to the ground, an electrostatic force of attraction acts between the second fixed comb tooth electrode 9 and the movable comb tooth electrode 5, and if this force is greater than the force which tends to retain the second stable state, the hinges 6A to 6D revert to their first stable state again.

It will be seen that in order to apply a voltage across the first or the second fixed comb tooth electrode 8 or 9 and the movable comb tooth electrode 5, bonding wires may be connected to the fixing parts 8a, 8b and 9a, 9b to which the first and the second fixed comb tooth electrode 8 and 9 are connected, for example, and a voltage may be applied across such bonding wires and the fixing part 10a.

In this optical switch, a movable part including the mirror 4, the movable rod 7, the support arms 5a and 5b and the movable comb tooth electrode 5 is supported by the hinges 6A to 6D in a displace able manner and movable portions other than the mirror 4 are constructed to exhibit an axial symmetry with respect to the centerline of the movable rod 7. In addition, points A, B, C and D where the movable rod 7 is supported by the four hinges 6A, 6B, 6C and 6D (or points where hinge reactions act) are located at positions which are symmetrical with respect to a point of connection between the support arms 5a and 5b and the movable rod 7 (or point S where the drive acts). In addition, the point S where the drive acts is designed to be substantially in coincidence with the center of gravity of the movable part. As a result of such construction, if a drive from the electrostatic actuator contains a vector component which is directed in a direction different from a desired direction in which the movable part is to be driven, reactions from the four hinges 6A to 6D act equally upon the unnecessary vector component contained in the drive, thus allowing a movement of the movable part in a direction other than the desired drive direction to be effectively suppressed.

In the event an external disturbance such as impact is applied, two structural features that 1) the four hinges 6A to 6D are disposed at positions which are symmetrical with respect to the center of gravity of the movable part and that 2) the movable comb tooth electrode 5 which represents a heavy structure is supported by the four hinges 6A to 6D in an equal manner allow an unintended movement of the movable part to be effectively suppressed.

Optical switch shown in FIGS. 2 to 4 can be manufactured as described below. FIGS. 7A to 7D are sections taken along the line 11A—11A shown in FIG. 2 during several steps.

Figure 7A:
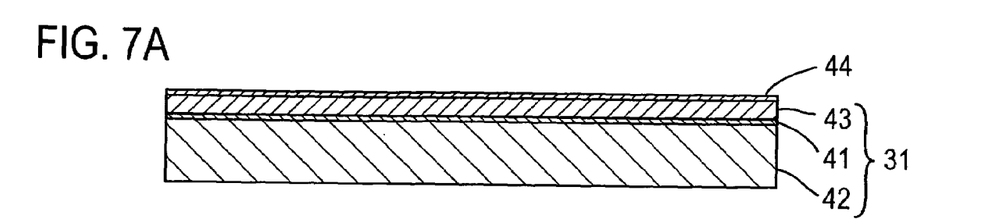
FIG. 7A is a cross section of a step during the manufacture of the optical switch shown in FIG. 2 when a layer of mask material is formed on top of an SOI substrate.

As shown in FIG. 7A, a three layer SOI substrate including a single crystal silicon substrate 42, on which an intermediate insulating layer 41 is formed and including a silicon single crystal layer 43 disposed on the insulating layer 41 is provided. In this example, the SOI substrate defines the substrate 31. The single crystal silicon substrate 42 may have a thickness of 350 µm, for example, and the intermediate insulating layer 41 may have a thickness of 3 µm, for example. The silicon single crystal layer 43 may have a thickness of 100 µm, for example. In the description to follow, the silicon single crystal layer 43 will be referred to as a device layer 43.

A layer of mask material 44 is formed on top of the device layer 43. The mask material for the layer 44 may comprise silicon oxide film, for example.

Figure 7B:
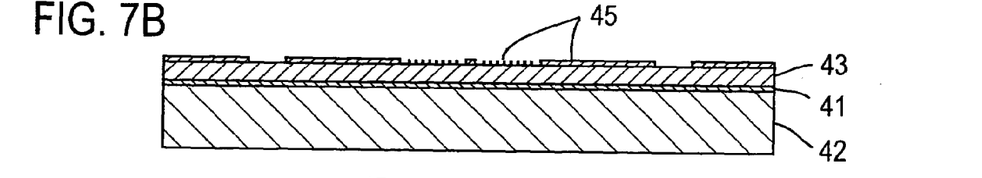
FIG. 7B is a cross section of another step when the layer of the mask material shown in FIG. 7A is patterned to form a mask.

Using the photolithography and the etching technique, the layer of mask material 44 is patterned to form a mask 45 as shown in FIG. 7B, the mask 45 defining the configuration of the movable part including the mirror 4, the movable rod 7, the support arms 5a and 5b, the movable comb tooth electrode 5 and the positions of the fiber channels 1A to 1D and also defining the configuration of the hinges 6A to 6D which support the movable part, the fixing parts 10a, 8a, 8b, 9a and 9b and the first and the second fixed comb tooth electrode 8 and 9.

Figure 7C:
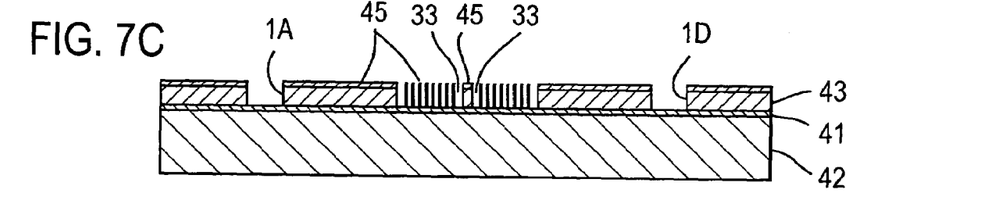
FIG. 7C is a cross section of a further step when a device layer which is exposed through the mask shown in FIG. 7B is subject to an etching operation.

Subsequently, a gas reactive dry etching which uses an ICP (Inductively Coupled Plasma) is performed upon the device layer 43 utilizing the mask 45, the dry etching taking place substantially perpendicularly to the sheet surface of the substrate 31 until the intermediate insulating layer 41 becomes exposed. This etching operation forms various structures of the movable part and the fixing part from the device layer 43.

Figure 7D:
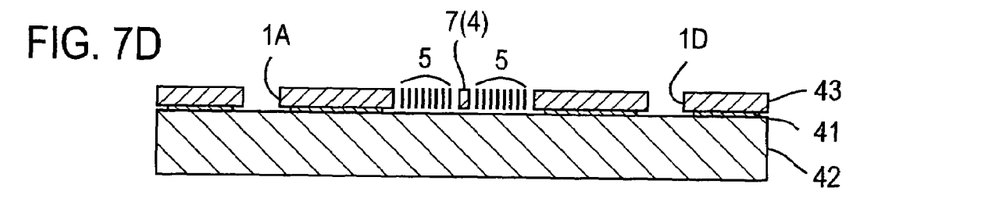
FIG. 7D is a cross section of still another step when an intermediate insulating layer is removed by the etching operation of FIG. 7C except for regions disposed below fixing parts.

After the surface of the device layer 43 is cleansed, it is immersed in a solution which exhibits an anisotropy of the etching rate with respect to the intermediate insulating layer 41, for example, a 50% solution of fluoric acid (HF) or a mixed solution of hydrofluoric acid and ammonium fluoride, to etch the exposed intermediate insulating layer 41. An etching time interval is chosen so that the intermediate insulating layer 41 is completely removed in regions corresponding to the movable part such as the mirror 4, the movable comb tooth electrode 5, and the movable rod 7 and the hinges 6A to 6D, and the first and the second fixed comb tooth electrode 8 and 9, but the intermediate insulating layer 41 is only marginally and slightly removed in regions such as the fixing parts 8a, 8b and 9a, 9b which should remain fixed to the single crystal silicon substrate 42. As a result of the etching operation, the movable part is supported by the hinges 6A to 6D to be movable on the fixing part 10a so that it is displace able on the single crystal silicon substrate 42 in a direction parallel to the sheet surface thereof. In this example, the intermediate insulating layer 41 and the layer of mask material 44 are formed by the same material, and accordingly, the mask 45 is simultaneously removed.

The both lateral surfaces of the mirror 4 are coated by a metal having a high reflectivity such as Au/PT/Ti multilayer film as by sputtering, thus forming the mirror surfaces.

With the optical switch mentioned above, the use of the hinges 6A to 6D which have two stable flexural states by a reversing operation allows the displaced condition of the mirror 4, which is achieved by the application of a voltage to the electrostatic actuator, to be maintained if the voltage ceases to be applied, thus enabling a reduction in the power dissipation.

However, it is found during an actual implementation of manufacturing the optical switch mentioned above that in some products, one or more of the hinges 6A to 6D remain attached to the wall surface of the hinge recesses 14a, 14b which are oppositely located to the hinges, as indicated in broken lines in FIG. 2, preventing a good yield from being expected.

Pursuit to investigate the cause for the fact that certain hinges 6A to 6D remain attached to the wall surface revealed that certain hinges 6A to 6D remain attached to the wall surface after the termination of the drying step which follows the wet etching of the intermediate insulating layer 41.

Figure 8:
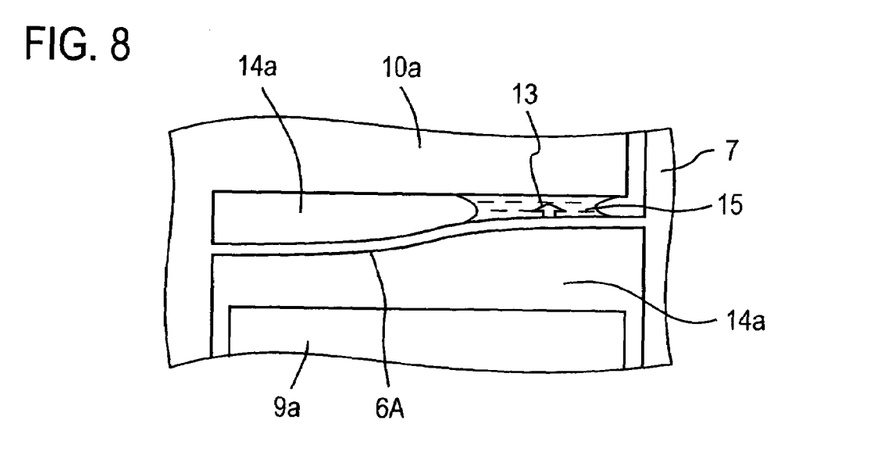
FIG. 8 is a fragmentary plan view, to an enlarged scale, of an exemplary condition of a liquid which remains during a drying step which follows a wet etching step during the manufacture of the optical switch shown in FIG. 2.

It is considered that this phenomenon is attributable to the fact that the recesses 14a and 14b in which the hinges 6A to 6D are disposed are rectangular in configuration in the optical switch shown in FIG. 2, and have a longer side which extends in a direction perpendicular to the lengthwise direction of the movable rod 7, while the hinges 6A to 6D have a flexed configuration as mentioned previously, and accordingly, a spacing between the sheet surface of each of the hinges 6A to 6D (lateral surface) and the opposing wall surfaces of the recesses 14a and 14b which are located on the opposite sides of the sheet surface is not uniform, but includes a widely spaced portion and a narrowly spaced portion. As a liquid which substitutes the liquid becomes evaporated during the drying step which follows the wet etching step, the liquid 15 becomes collected in a narrowly spaced space as shown in FIG. 8 due to the action of the surface tension, whereby the hinge 6A is held attracted to the wall surface of the recess 14a, as indicated by an arrow 13, and remains attracted to the wall surface under the influence of the van dear Wails' force after the drying step.

Such difficulty could be prevented by a technique in which the etchants solution is replaced by a liquid which is susceptible to sublimation under a reduced pressure, and the liquid is solidified at a low temperature to promote the sublimation of the resulting solid, by a super critical drying process in which the etchants solution is replaced by a liquefied carbon dioxide ($CO_2$) and a drying step is continued in an environment of an elevated temperature and high pressure which does not accompany a state change from the liquid phase to the gas phase, or by a technique in which the etchants solution is simply replaced by another liquid such as fluorinated (manufactured by 3M company in the United States) having a reduced surface tension for performing the drying step. Of these options, it is simple and practical to perform the drying step using a liquid having a reduced surface tension, but it is found that this has a drawback that the reliability is unwarranted.

It is to be noted that while it may be contemplated to increase the rigidity of the hinges 6A to 6D, for example, to prevent such phenomenon from occurring, it is not possible to increase the rigidity at will in consideration of a drive voltage.

It is considered that a similar problem occurs in a miniature movable device such as a relay device in which the movable contact of the relay is supported by a bistable hinge so that the movable contact can be switched between a pair of fixed contacts and the switched condition is to be self-held or so that the movable contact is maintained in contact or not in contact with the fixed contact and such condition is to be self held or a shock sensor which is obtained by replacing the mirror of the optical switch mentioned above by a mass carrier and replacing the electrostatic actuator by a capacitive displacement sensor so that the position of the mass carrier is switched in response to an input of an acceleration which exceeds a given threshold value.

SUMMARY OF THE INVENTION

It is an object of the present invention to provide a miniature movable device which supports a movable part by a hinge or hinges having two stable flexural conditions which are reversed in flexural and maintains the displaced condition of the movable part in a manner which can be manufactured with a good yield.

According to the present invention, there is provided a miniature movable device comprising a movable part formed on a substrate and adapted to be displaced in a direction parallel to the sheet surface of the substrate, a fixing part formed and fixedly mounted on the substrate, and a hinge having its opposite ends connected to the movable part and the fixing part and capable of assuming two flexural conditions which are reversed in flexural to permit the movable part to be maintained in one of two positions corresponding to two flexural conditions by a self-holding action, the substrate being formed with wall surfaces which are disposed in opposing relationship with the both sides of the hinge over an extent of the movement of the hinge, spacings between the hinge and the oppositely located wall surfaces on the both sides thereof which can be brought into contact with the hinge being equal to each other at every point along the lengthwise direction of the hinge in one of the two flexural conditions of the hinge.

In accordance with the present invention, the spacings between the hinge and wall surfaces on the both sides thereof are equal to each other along the length of the hinge, and accordingly, during a drying step which follows a wet etching during the manufacture of the miniature movable device, the amount of liquid diminishes in an equal manner on the opposite sides of the hinge. In other words, there is no occurrence that the liquid remains only on one side of the hinge due to an offset in the timing of evaporation and the surface tension of the remaining liquid causes the hinge to be held attracted to the wall surface of the recess.

DESCRIPTION OF PREFERRED EMBODIMENT

Figure 9:
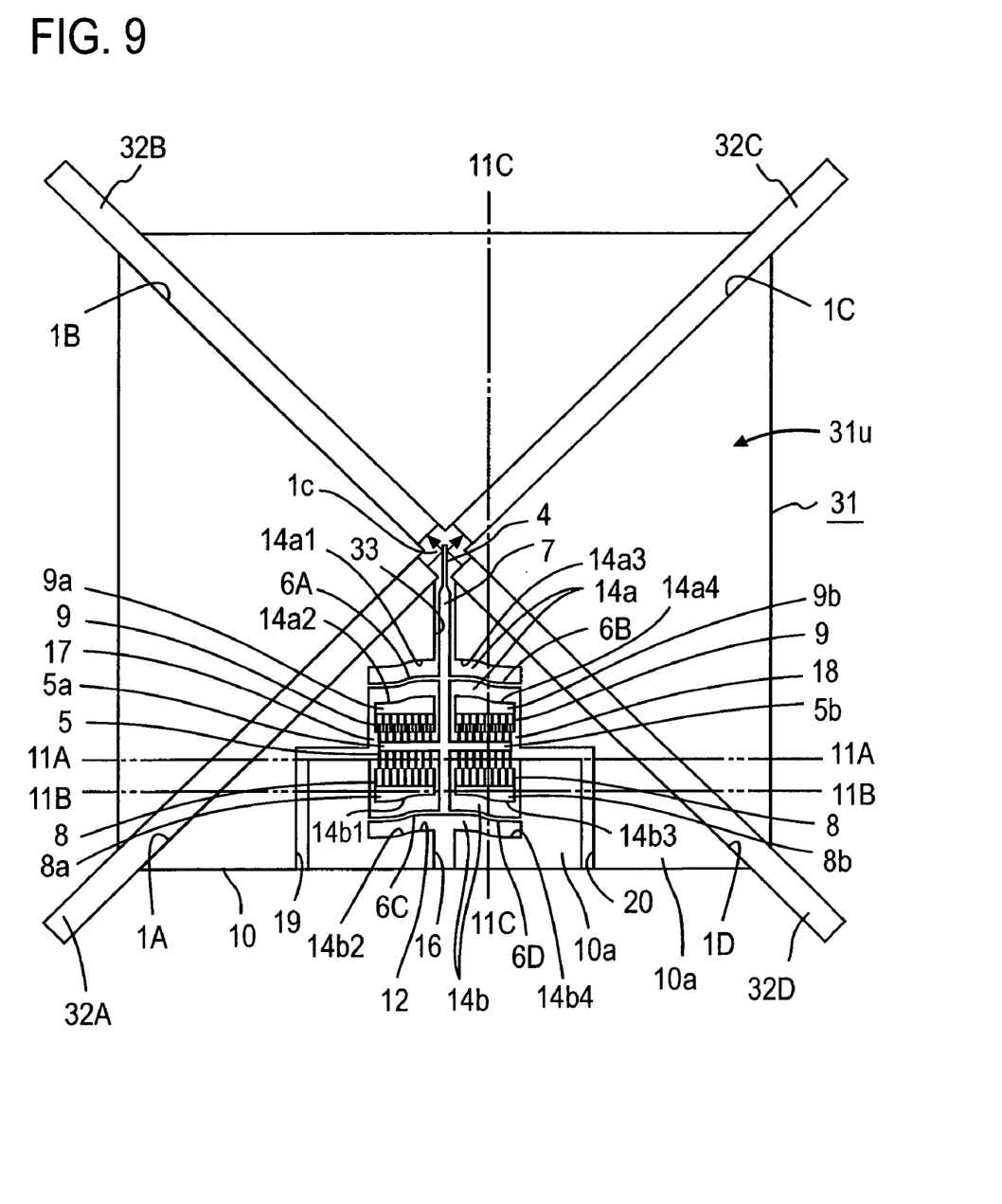
FIG. 9 is a plan view of an embodiment of the present invention.
Figure 10:
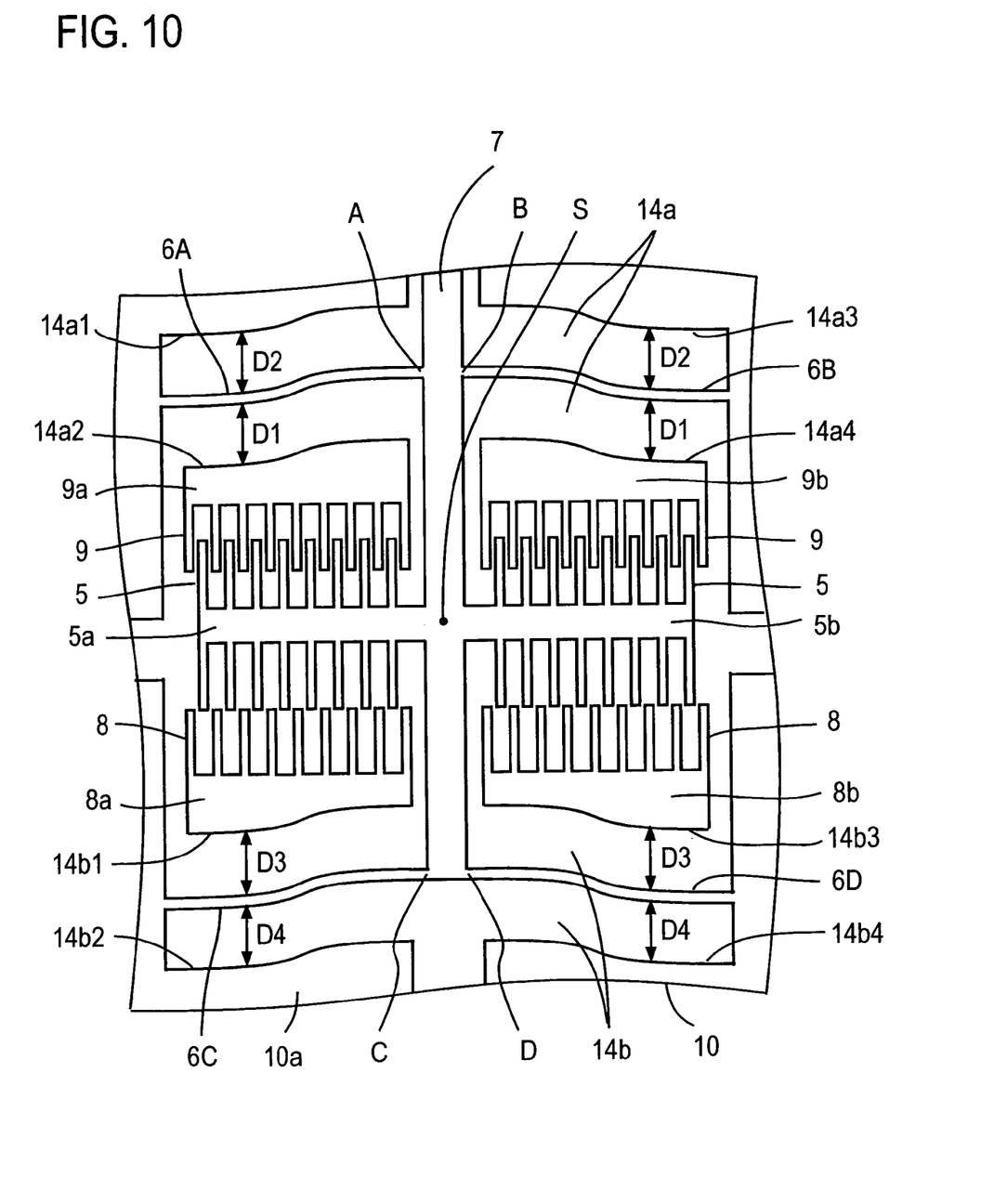
FIG. 10 is a fragmentary plan view, to an enlarged scale, of the optical switch shown in FIG. 9.

Referring to FIGS. 9 and 10, an embodiment of the present invention as applied to an optical switch shown in FIG. 2 will now be described. It is to be understood that parts corresponding to those shown in FIG. 2 are designated by like reference characters as used before in order to avoid a duplicate description.

In this example, under the initial condition which prevails upon manufacture of the optical switch, a mirror 4 is positioned at the center 1c of fiber channels 1A to 1D which are disposed in a crisscross configuration, in the similar manner as in the optical switch shown in FIG. 2. Under this condition, spacings between the sheet surface (lateral surface) of each of the hinges 6A to 6D and opposing wall surfaces of a recess 14a or 14b which are located on the opposite sides of the hinge are equal to each other at every point along the lengthwise direction of each of the hinges 6A to 6D.

In addition, in this example, spacings D1 and D2 between the hinges 6A and 6B and wall surfaces 14a2, 14a1 and 14a4, 14a3 of the recess 14a which are disposed on the opposite sides thereof as well as spacings D3 and D4 between the hinges 6C and 6D and wall surfaces 14b1, 14b2 and 14b3, 14b4 of the recess 14b which are disposed on the opposite sides thereof are constant in the lengthwise direction of the hinges 6A to 6D over the entire length which is disposed opposite to the wall surfaces 14a2, 14a1, 14a4, 14a3, 14b1, 14b2, 14b3 and 14b4 and satisfy the equality D1=D2=D3=D4.

However, a choice of D1≠D3 for example, is possible even though it is required that D1=D2 and D3=D4. It is described above that D1, D2, D3 and D4 are constant over the entire length of the hinges 6A to 6D, but this requirement can be modified in a manner illustrated in FIG. 11. Specifically, denoting the spacing between the hinge 6A and the wall surfaces 14a2 and 14a1 as measured at the end toward the movable rod 7 by D1a and D2a, respectively, and the spacing between the hinge 6A and the wall surface 14a2 and 14a1 as measured at the opposite end by D1b and D2b, a choice of D1a≠D1b is allowable even though it is required that D1a=D2a and D1b=D2b.

In this example, the recesses 14a and 14b in which the hinges 6A to 6D are contained are connected with channels formed in the top surface 31u of the substrate 31 and which are open to the edges or channels formed by the device layer 43 on top of the single crystal silicon substrate 42 and open to the edges thereof.

The recess 14a which is disposed on one side of the hinges 6A and 6B communicate with the recess 14a on the other side thereof through a clearance between the movable rod 7 and the hinges 6A and 6B on one hand and the bottom surface of the recess 14a on the other hand, and is connected to the center 1c of the fiber channels 1A to 1D through the rod channel 33, and the fiber channels 1A to 1D extend to respective bums of square-shaped substrate 31 and are open to the exterior.

On the other hand, the recess 14b which is disposed on one side of the hinges 6C and 6D is connected to the recess 14b on the other side thereof through a clearance between the movable rod 7 and the hinges 6C and 6D on one hand and the bottom surface of the recess 14b, and is connected to an open channel 16 formed between the recess 14b and the edge of the substrate 31 so as to extend the rod channel 33 in a direction away from the center 1c.

In addition, in this example, the recesses 14a and 14b communicated with each other through communication channels 17 and 18, which are in communication with open channels 19 and 20 which extend to the edge of the substrate 31, in a manner as shown in FIG. 9.

The optical switch shown in FIGS. 9 and 10 can be manufactured according to the method of manufacturing illustrated in FIGS. 7A to 7D in the similar manner as the optical switch shown in FIG. 2. When patterning the layer of mask material 44, the hinges 6A to 6D are formed so that they assume one of the two flexural conditions (or the configuration assumed under the initial condition), and so that the configuration of the wall surfaces of the recesses 14a and 14b as well as the spacings between these wall surfaces 14a1 to 14a4 and 14b1 to 14b4 and the hinges 6Alto 6D are formed as mentioned above together with the open channels 16, 19 and 20 formed in a manner mentioned above. In other words, the patterning of the layer of mask material 44 takes place according to the plan view shown in FIG. 9.

Figure 11:
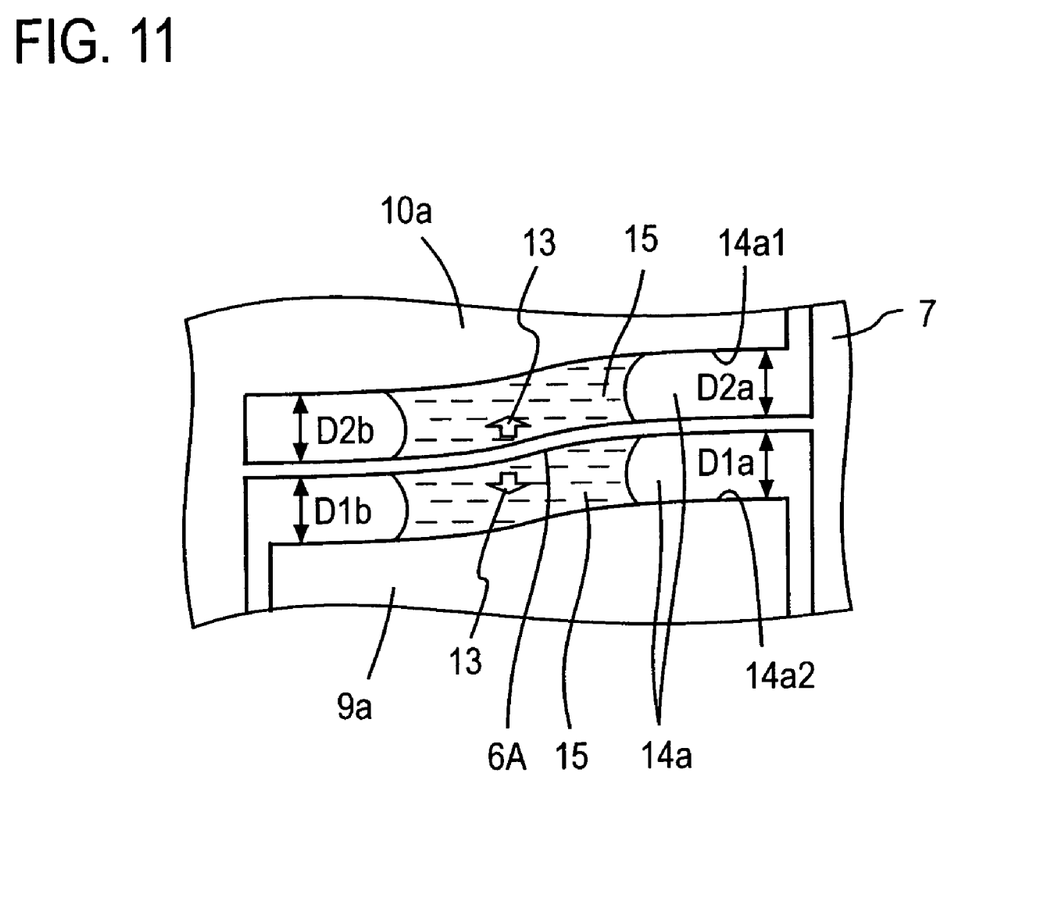
FIG. 11 is a fragmentary plan view, to an enlarged scale, illustrating a condition of the liquid which remains during the drying step which follows the wet etching operation during the manufacture of the optical switch shown in FIG. 9.

With the optical switch constructed in the manner mentioned above, the spacings between the hinges 6A to 6D and the wall surfaces of the recesses 14a, 14b which are disposed oppositely to the hinges 6A to 6D over a movable range thereof are equal at every point along the lengthwise direction of the hinges 6A to 6D. Accordingly, during the drying step which follows the wet etching in the manufacturing of the optical switch, a liquid 15 such as water or ethanol which is normally substituted for the etchants solution diminishes in an equal manner on the opposite sides of the hinge 6A, as illustrated in FIG. 11, thus avoiding the occurrence of a difficulty experienced in a conventional optical switch as shown in FIG. 2 that an offset in the timing of evaporation causes the liquid 15 to remain only on one side of the hinge 6A, causing the hinge 6A to be held attracted to the wall surface 14a1 (or 14a2) of the recess 14a under the influence of the surface tension of the liquid 15 which remains on one side upon completion of the drying step. Accordingly, during the drying step which follows the wet etching operation, a direct drying operation can be performed from the rinse liquid such as water without requiring a substitution to another special liquid. In that respect, the drying operation can take place in a simple and favorable manner, allowing the optical switch to be manufactured with a good yield. Though the spacings between each of the hinges 6A to 6D and the wall surfaces which are disposed on the opposite sides thereof are chosen to be equal to each other at every point along the lengthwise direction over the entire length of the hinges 6A to 6D which is located oppositely to the wall surfaces of the recess 14a or 14b in this example, it should be noted that the extent over which the spacings to the wall surfaces on the opposite sides should be equal to each other is not always required to be over the entire length, but is required to be satisfied at least in an extent in which the hinges 6A to 6D can be brought into contact with the wall surfaces.

Since the recesses 14a and 14b in which the hinges 6A to 6D are contained are connected to the fiber channels 1A to 1D and the open channels 16, 19 and 20 which are open to the exterior, it is possible to allow the liquid to flow out of the substrate 31 during the drying step which follows the wet etching operation, allowing the drying step to be expedited or the drying time to be reduced in length.

In addition, since the recesses 14a and 14b disposed on the opposite sides of the hinges 6A to 6D are connected to the clearance between the hinges 6A to 6D and the movable rod 7 on one hand and the bottom surfaces of the recesses 14a and 14b, if only the open channel 16 is provided without providing the open channels 19 and 20, it is possible to allow the liquid to flow out of the substrate to expedite the drying step.

However, when only the open channel 16 is provided, the liquid will be more rapidly displaced from a region of the recess 14a connected through the rod channel 33 to the fiber channel 1A to 1D which are open to the exterior of the substrate 31 that is located between the hinges 6A and 6B and the wall surfaces 14a1 and 14a3 and from a region of the recess 14b which is directly connected to the open channel 16 that is located between the hinges 6C and 6D and the wall surfaces 14b2 and 14b4, while a displacement of the liquid from a region of the recess 14a that is defined between the hinges 6A and 6B and the wall surfaces 14a2 and 14a4 and from a region of the recess 14b that is defined between the hinges 6C and 6D and the wall surfaces 14b1 and 14b3 will be retarded relative to the displacement from the first mentioned regions. Accordingly, it is desirable that the open channels 19 and 20 be also provided so that the displacement of the liquid from regions defined between the hinges 6A to 6D and wall surfaces 14a2, 14a4, 14b1, 14b3 be expedited to achieve a balance of diminishment of the liquid from the opposite sides of the hinges 6A to 6D during the drying step in a more reliable manner.

It is to be understood that the present invention is usable not only with the optical switch, but is also applicable to a miniature movable device such as a relay device, a shock sensor or the like in which the photolithography and the etching technique are used to support a movable part with a hinge or hinges capable of assuming two stable flexural conditions by a reversible operation in order to maintain the movable part at two positions in a stable manner by a self-holding action.

What is claimed is:

1. A miniature movable device comprising
   a movable part disposed on a substrate and displaceable in parallel to a sheet surface of the substrate, the movable part having a rod portion,
   at least one pair of fixing parts formed fixedly on the substrate, and
   at least one pair of hinges which are in the form of a leaf spring, one end of each hinge of the pair connecting to a respective side of the rod portion and the other end of each hinge extending away from the rod portion, extending away from the other hinge and connecting to a respective one of the fixing parts so that the hinges are capable of assuming two flexure conditions which are reversed in flexure, wherein the pair of hinges maintain the movable part at two positions by a mechanical self-holding action when the pair of hinges assume the two flexure conditions, wherein the substrate is formed with pairs of wall surfaces, each wall surface of the pair disposed across from a respective side of a hinge, and wherein spacings between each hinge and each respective pair of wall surfaces are equal at corresponding points along the lengthwise direction of the hinge where a wall surface can contact the hinge when the hinge assumes one of the two flexure conditions.

2. The miniature movable device according to claim 1, wherein the substrate has
- a plurality of recesses with the pairs of wall surfaces in which the pairs of hinges are disposed and
- a channel to which the plurality of recesses communicate and which is open to an edge of the substrate.

3. The miniature movable device according to claim 1, further comprising: drive means for driving the movable part between the two positions.

4. The miniature movable device according to claim 3, wherein there are provided two pairs of the hinges and two pairs of fixing parts, one pair of the hinges being connected at one ends thereof to opposite sides of the rod portion at a first location along a lengthwise direction of the rod portion, extended to opposite directions from the opposite sides of the rod portion and connected at the other ends thereof to the one pair of fixing parts, and the other pair of the hinges being connected at one ends thereof to opposite sides of the rod portion at a second location apart from the first location along the lengthwise direction of the rod portion, extended to opposite directions from the opposite sides of the rod portion and connected at the other ends thereof to the other pair of fixing parts, so that the rod portion is suspended by the two pairs of the hinges between the two pairs of fixing parts over the substrate in a manner capable of moving in a lengthwise direction of the rod portion between the two positions by means of the driving means.

5. The miniature movable device according to claim 4 in which the pairs of hinges act in concert to suppress movement in a direction other than a desired drive direction.

* * * * *